US011264866B2

(12) United States Patent
Stetina et al.

(10) Patent No.: US 11,264,866 B2
(45) Date of Patent: Mar. 1, 2022

(54) PUMP ARRANGEMENT, AXIAL-FLOW MACHINE AND COMPRESSOR COMPRISING AT LEAST ONE ROTOR HAVING PERMANENT MAGNETS AND A STATOR HAVING A MULTIPLICITY OF TEETH SEPARATED FROM EACH OTHER WHEREIN THE TOOTH TIP HAS A SUBSTANTIALLY RECTANGULAR-SHAPED CROSS SECTION

(71) Applicant: Miba Sinter Austria GmbH, Laakirchen (AT)

(72) Inventors: Gerold Stetina, Voecklabruck (AT); Christian Sandner, Gmunden (AT); Thomas Riedl, St. Pantaleon-Erla (AT); Dietmar Andessner, Offenhausen (AT)

(73) Assignee: Miba Sinter Austria GmbH, Laakirchen (AT)

( * ) Notice: Subject to any disclaimer, the term of this patent is extended or adjusted under 35 U.S.C. 154(b) by 132 days.

(21) Appl. No.: 16/211,663

(22) Filed: Dec. 6, 2018

(65) Prior Publication Data
US 2019/0242393 A1 Aug. 8, 2019

(30) Foreign Application Priority Data

Feb. 8, 2018 (AT) .............................. A 50120/2018

(51) Int. Cl.
*H02K 7/06* (2006.01)
*F04D 29/18* (2006.01)
(Continued)

(52) U.S. Cl.
CPC ................. *H02K 7/14* (2013.01); *F04B 1/00* (2013.01); *F04D 3/00* (2013.01); *F04D 15/0066* (2013.01);
(Continued)

(58) Field of Classification Search
CPC ...... F04D 29/041; F04D 3/00; F04D 15/0066; F04D 19/007; F04D 25/026;
(Continued)

(56) References Cited

U.S. PATENT DOCUMENTS 2,583,583 A * 1/1952 Mangan .............. F04B 39/0246
417/372
2,797,857 A * 7/1957 Warner ................... F25B 31/02
417/372
(Continued)

FOREIGN PATENT DOCUMENTS

CN 102365810 A 2/2012
CN 102792557 A 11/2012
(Continued)

*Primary Examiner* — Kenneth J Hansen
*Assistant Examiner* — Benjamin Doyle
(74) *Attorney, Agent, or Firm* — Collard & Roe, P.C.

(57) ABSTRACT

A pump arrangement includes an axial-flow machine and a drive to convey fluid mounted in a housing. The axial-flow machine is formed by at least one first rotor having permanent magnets, a shaft connected to the first rotor and a stator arrangement with stator teeth distributed concentrically around the shaft axis circumferentially and axially separated from the first rotor by an air gap. The stator teeth have axially-opposite end portions and a tooth core therebetween wound with at least one coil winding. The second end portion, turned away from the first rotor, of each stator tooth forms a tooth root joined to a back plate. The first rotor is an eccentric disk and on the side away from the stator arrangement has an eccentric cam, radially spaced from the shaft axis, and rotatably and torque-transmittingly connected to the drive. An axial-flow machine and a compressor includes the pump arrangement.

12 Claims, 5 Drawing Sheets

(51) Int. Cl.

| | | |
|---|---|---|
| *F04D 29/32* | (2006.01) | |
| *H02K 16/02* | (2006.01) | |
| *H02K 21/24* | (2006.01) | |
| *H02K 7/14* | (2006.01) | |
| *F04B 1/00* | (2020.01) | |
| *F04D 15/00* | (2006.01) | |
| *F04D 19/00* | (2006.01) | |
| *F04D 25/02* | (2006.01) | |
| *F04D 25/06* | (2006.01) | |
| *F04D 29/041* | (2006.01) | |
| *F25B 31/02* | (2006.01) | |
| *F04D 3/00* | (2006.01) | |

(52) U.S. Cl.
CPC ......... *F04D 19/007* (2013.01); *F04D 25/026* (2013.01); *F04D 25/068* (2013.01); *F04D 29/041* (2013.01); *F04D 29/185* (2013.01); *F04D 29/321* (2013.01); *F25B 31/026* (2013.01); *H02K 7/06* (2013.01); *H02K 7/063* (2013.01); *H02K 16/02* (2013.01); *H02K 21/24* (2013.01)

(58) Field of Classification Search
CPC .... F04D 25/068; F04D 29/185; F04D 29/321; F04B 1/00; F25B 31/026; H02K 7/06; H02K 7/063; H02K 7/14; H02K 16/02; H02K 21/24; H02K 21/28
USPC .......................................................... 417/420
See application file for complete search history.

(56) References Cited

U.S. PATENT DOCUMENTS

| | | | | |
|---|---|---|---|---|
| 3,484,822 | A * | 12/1969 | Holme | F25B 31/02 92/128 |
| 3,493,168 | A * | 2/1970 | Valbjorn | F25B 31/023 417/415 |
| 3,836,290 | A * | 9/1974 | Carter | H02K 7/14 417/415 |
| 4,401,419 | A * | 8/1983 | Rabe | F25B 31/02 310/268 |
| 5,118,263 | A * | 6/1992 | Fritchman | F04B 39/0292 184/18 |
| 5,232,351 | A * | 8/1993 | Robertson | F04B 39/0246 184/6.18 |
| 5,476,369 | A * | 12/1995 | Fowlkes | F04B 35/04 310/51 |
| 6,024,542 | A * | 2/2000 | Phillips | F04B 1/053 417/273 |
| 8,888,468 | B2 * | 11/2014 | Maganhoto | F04B 39/127 417/363 |
| 2013/0200746 | A1 | 8/2013 | Foulsham et al. | |
| 2018/0323679 | A1 * | 11/2018 | Woolmer | H02K 1/20 |
| 2019/0013707 | A1 * | 1/2019 | Mihai | H02K 21/24 |
| 2020/0067391 | A1 * | 2/2020 | Sandner | H02K 1/2793 |

FOREIGN PATENT DOCUMENTS

| | | |
|---|---|---|
| CN | 105990967 A | 10/2016 |
| CN | 107294325 A | 10/2017 |
| DE | 2 938 255 A1 | 4/1981 |
| DE | 268510 A1 | 5/1989 |
| GB | 2 067 023 A | 7/1981 |
| WO | 2010/092402 A1 | 8/2010 |

* cited by examiner

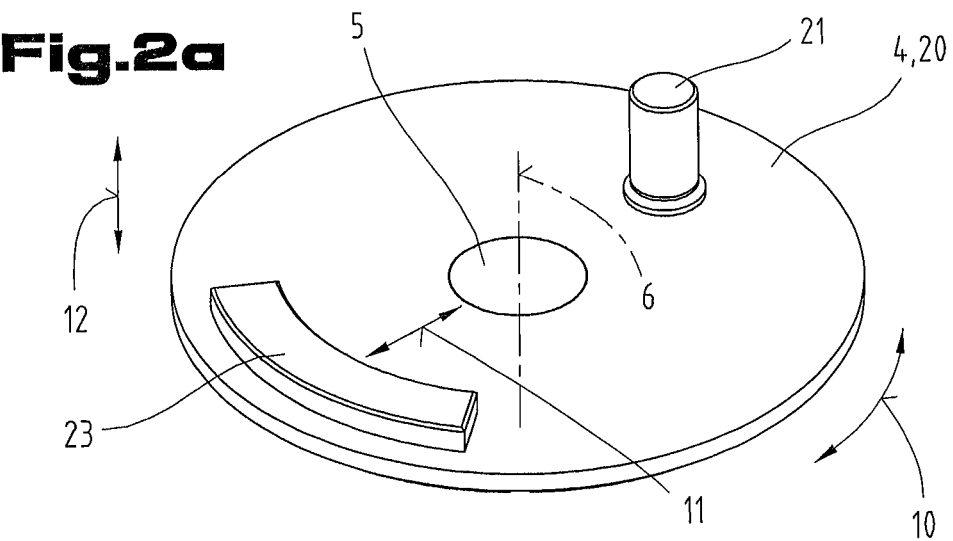
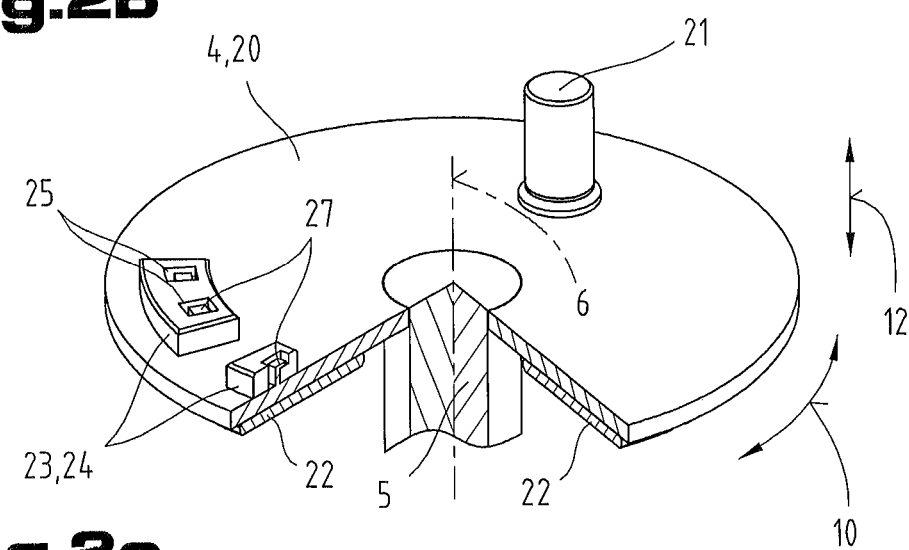
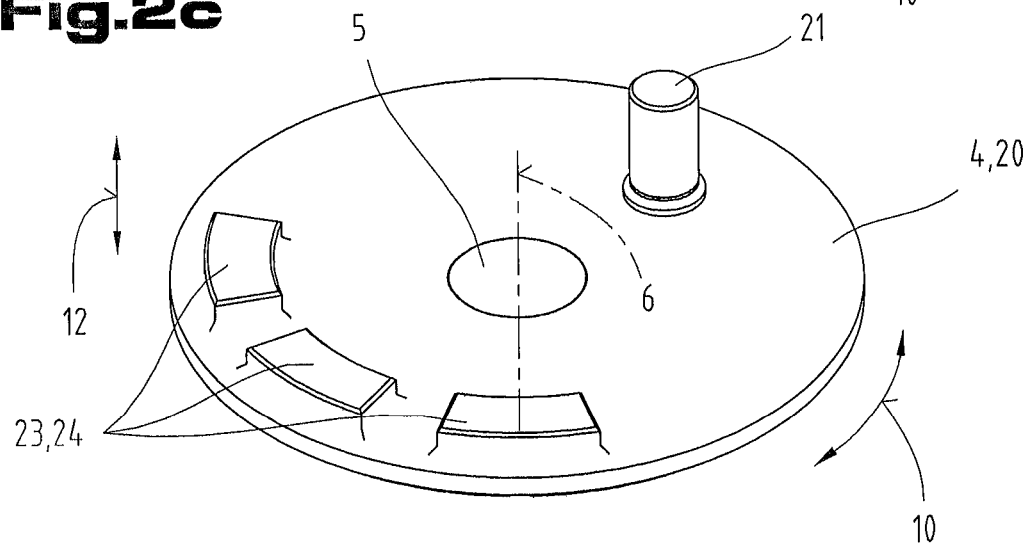

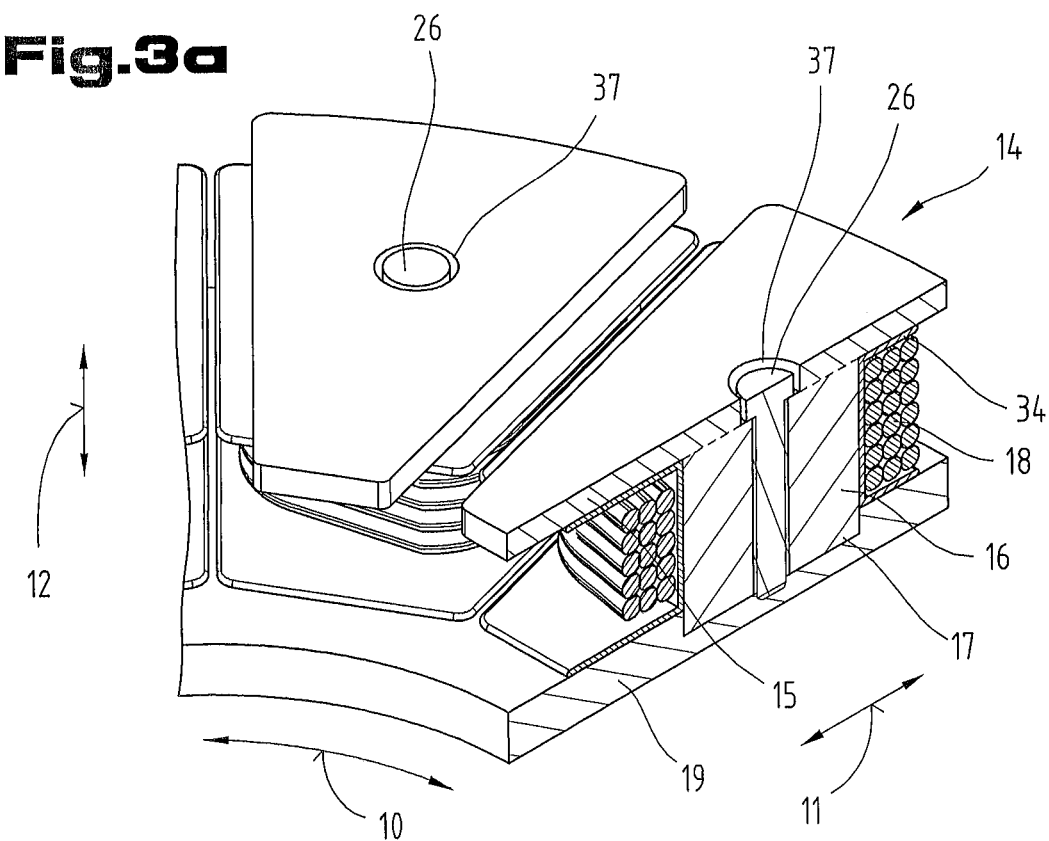
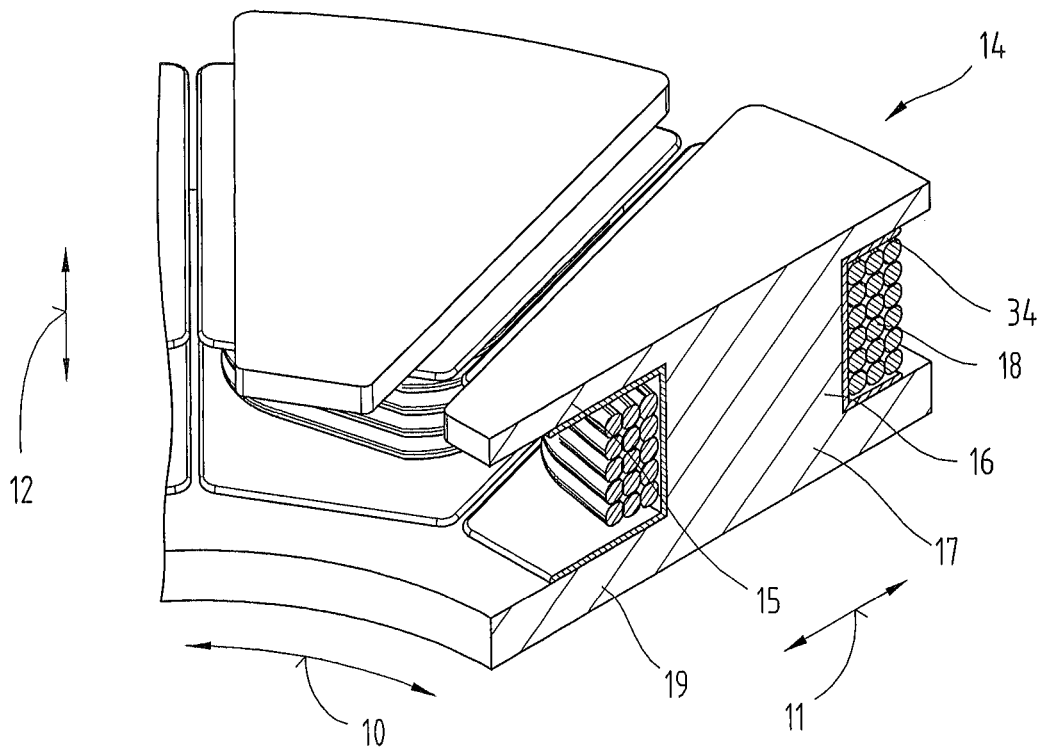

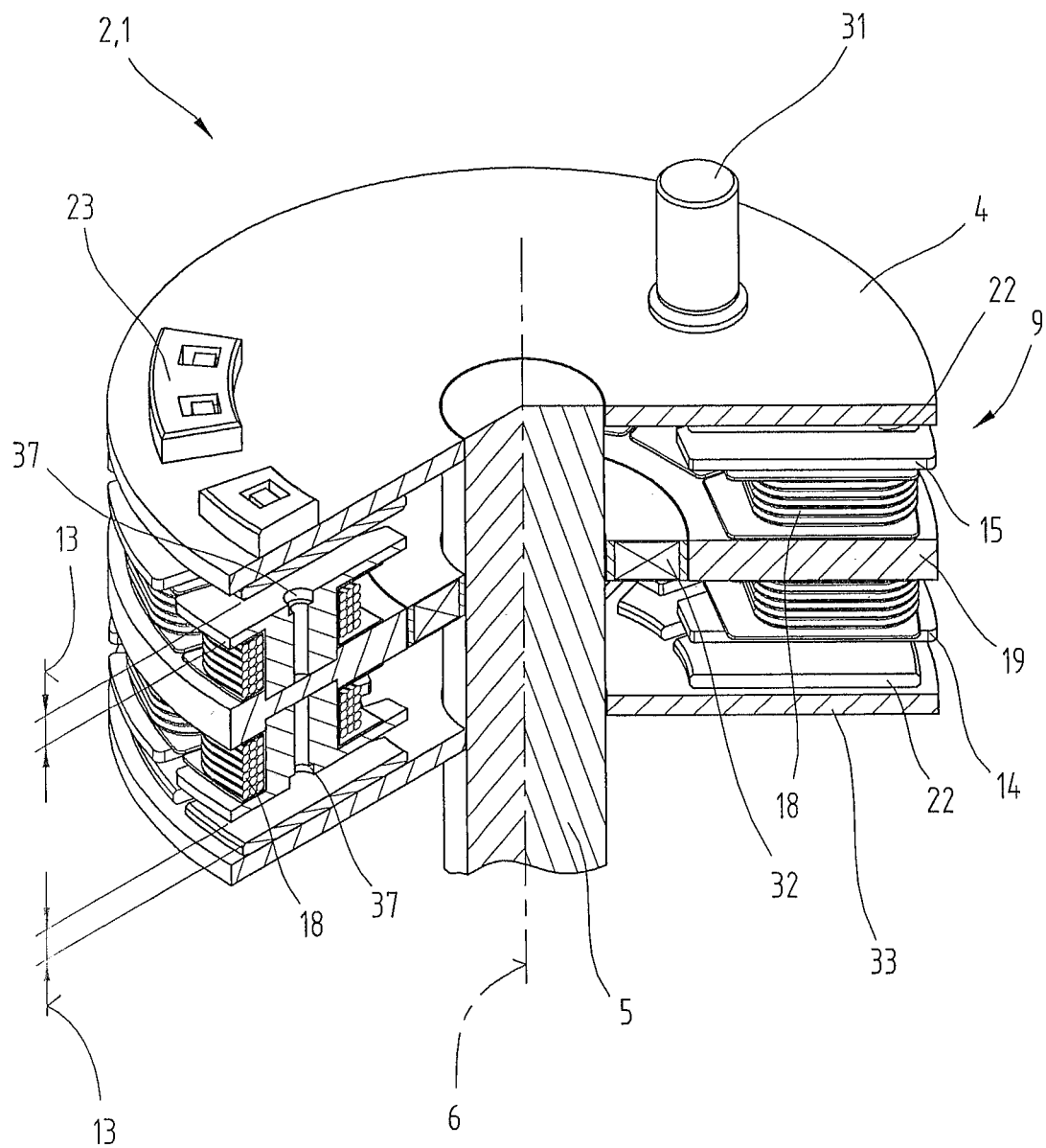

PUMP ARRANGEMENT, AXIAL-FLOW MACHINE AND COMPRESSOR COMPRISING AT LEAST ONE ROTOR HAVING PERMANENT MAGNETS AND A STATOR HAVING A MULTIPLICITY OF TEETH SEPARATED FROM EACH OTHER WHEREIN THE TOOTH TIP HAS A SUBSTANTIALLY RECTANGULAR-SHAPED CROSS SECTION

CROSS REFERENCE TO RELATED APPLICATIONS

Applicant claims priority under 35 U.S.C. § 119 of Austrian Application No. A 50120/2018 filed Feb. 8, 2018, the disclosure of which is incorporated by reference.

BACKGROUND OF THE INVENTION

1. Field of the Invention

The invention relates to a pump arrangement as well as to an axial-flow machine provided with this pump arrangement, comprising at least one drive means for conveyance of a fluid, at least one rotor as well as at least one stator arrangement connected via a shaft to the at least one rotor, which are mounted in a housing.

2. Description of the Related Art

In the modern construction not only of pumps and compressors but also of electrical auxiliary drives, mainly overall size or total weight of the components is considered. Especially in the automobile industry, but also in the consumer goods sector, the reduction of the necessary space requirement and weight of a drive unit while keeping the efficiency constant or even increasing it are desired.

Known pump arrangements usually use an electrical drive unit, which is connected via a drive shaft to a drive means for a fluid, i.e. a liquid or gaseous medium. For this purpose, various concepts, such as gear pumps, piston pumps, scroll pumps or radial-flow or centrifugal pumps are used as drive means, depending on the liquid or gaseous medium to be conveyed.

For the application as a pump or compressor in automobiles, and especially refrigerators or as cooling compressors, a low overall height with simultaneously high pump power and low energy consumption is decisive for the economics. Known, above-mentioned pump arrangements are often unable to fulfill these criteria.

SUMMARY OF THE INVENTION

The task of the present invention was to overcome the disadvantages of the prior art and to provide an apparatus by means of which a user is able to realize a simple pump arrangement that has little space requirement or occupies little installation space. Beyond this, the energy demand of the pump or of the compressor can usually be reduced thereby.

This task is accomplished by an apparatus and a method according to the claims.

The apparatus according to the invention comprises a pump arrangement, at least comprising a housing, in which an axial-flow machine as well as a drive means designed for conveyance of a fluid are mounted, wherein the axial-flow machine at least is formed by at least one first rotor, a shaft connected to the first rotor and a stator arrangement, wherein the shaft has a shaft axis and wherein the stator arrangement has a multiplicity of stator teeth distributed concentrically around the shaft axis and disposed separated from the first rotor in axial direction by an air gap, which stator teeth have two end portions situated oppositely in axial direction and a tooth core between the end portions, and each tooth core is wound with at least one coil winding, and wherein the second end portion, turned away from the first rotor, of each stator tooth is designed as a tooth root, which is joined to a back plate, wherein the first rotor is designed as an eccentric disk and on the side of the first rotor turned away from the stator arrangement has, spaced apart from the shaft axis in radial direction, an eccentric cam which is connected to the drive means in torque-transmitting and rotatable manner.

Due to the use of an axial-flow machine, the described pump arrangement has a distinct reduction of the overall height, compared with radial-flow motors of the same drive power and/or same efficiency.

The housing is a hermetically sealed structural part, which has diverse openings for the inflow and outflow of fluids to be conveyed, electrical terminals and the like. Among other items, including the drive means for conveyance of the fluid, at least one rotor, one stator arrangement, possibly bearing means and/or bracing means for the at least one rotor or the stator arrangement are received in the housing of the pump arrangement.

The pump arrangement according to the invention may be used in particular for compressors of a cooling system in mobile and/or stationary refrigerators. Such a compression cooling system usually comprises a compression or compressor unit, a condenser, a throttle unit (e.g. capillary tube) and an evaporator. These structural parts are known to the person skilled in the art and are therefore not explained further at this place. Furthermore, the presented pump arrangement is suitable for piston pumps, centrifugal pumps or radial-flow pumps or such compressors. In the present Application, all components of a pump or of a compressor, such as cylinders, pistons, connecting rods and the like, for example, will be referred to collectively as drive means, unless otherwise necessary at appropriate places.

Within the scope of the invention, therefore, mainly gaseous media, such as a refrigerant or air, but also liquid media such as urea solutions, water or similar liquids, for example may be meant as fluid.

The pump arrangement according to the invention encompasses a stator arrangement, which has a multiplicity of stator teeth, which depends on the number of permanent magnets that are formed on or in the rotor disposed oppositely in axial direction. The stator or the stator arrangement is disposed symmetrically around the shaft, which is rigidly joined to the at least one rotor. The bearing of the shaft will not be further explained here, since various options for construction of bearing means capable of absorbing axial and/or radial forces of the shaft are known to the person skilled in the art. The stator teeth respectively have a tooth core, which has a tooth cross-sectional area normal to its extent in axial direction. The stator teeth are fastened to the back plate by means of an end portion, namely the tooth root. For this purpose, the stator teeth may be joined to the back plate by way of a fastening means, such as a screw, for example, or an adhesive joint.

Each stator tooth has a coil winding, which is wound around the tooth core and upon passage of current induces a magnetic field. These coil windings are electrically insulated by an insulation at least of the tooth core and of the back plate.

For generation of an eccentric movement, a shaft is usually set in rotation by means of a rotor and an eccentric disk or even eccentric shank is connected to the shaft. Due to the construction, according to the invention, of the first rotor as an eccentric disk, wherein an eccentric cam is formed on the side of the rotor turned away from the stator arrangement, known eccentric shaft arrangements can be simply replaced. For simplification of the description, the shaft axis around which the at least one rotor or the eccentric cam executes a circular movement will be used as reference point. This eccentric cam should have a suitable spacing from the shaft in radial direction and be connected in torque-transmitting manner to the drive means, for example as a connecting rod. For this purpose, the eccentric cam may be connected, preferably welded to the rotor, for simultaneous formation of an eccentric disk, by way of a fastening means.

Due to this pump arrangement, a significant reduction of the overall height may be achieved by use of an axial-flow motor in direct combination with the drive means. Furthermore, a reduction of the weight, by omission of an additional eccentric disk or of an eccentric shank among other possibilities, may be achieved by the described arrangement.

Furthermore, it may be expedient when at least the first rotor has at least one compensating mass, which is formed on the side turned away from the stator arrangement and is spaced apart from the shaft axis in radial direction, and is disposed substantially opposite the eccentric cam in radial direction.

In contrast to conventional eccentric shaft arrangements, it is of advantage in the present pump arrangement when compensating masses are disposed directly on the rotor. Advantageously, the at least one compensating mass is disposed substantially opposite the eccentric cam in radial direction, whereby the generation of vibrations, initiated by the rotor movement, and the direct torque transfer, associated therewith, to the drive means, may be reduced.

Furthermore, it may be provided that the at least one compensating mass is formed from several compensating-mass portions, which are disposed separated from one another in circumferential and/or radial direction.

Due to the need for free rotation of the rotor and components of the drive means connected thereto, the height of the at least one compensating mass in axial direction is limited. In order to ensure an optimum vibration damping, the at least one compensating mass may therefore be subdivided into several parts or compensating-mass portions, which achieves a distribution of the compensating mass in circumferential direction. This further ensures that the compensating-mass portions differ from one another in shape and size and can be adapted individually to the geometry of the rotor-eccentric disk composite. In this connection, it is also conceivable that the compensating-mass portions are disposed in such a way that adjacent compensating-mass portions touch on at least one side face, whereby a very compact arrangement can be achieved.

Beyond this, it may be provided that the at least one compensating mass has at least one recess, which is suitable for receiving of at least one prolongation of the first rotor and/or of at least one fastening means, and is designed to be interlockingly connectable to the first rotor on its side turned away from the stator arrangement.

Due to the formation of the at least one compensating mass with at least one recess, an interlocking connection to the rotor can be achieved relatively simply. In this connection, the at least one recess may be formed in axial direction passing through the at least one compensating mass. The rotor may have prolongations, which are designed as tabs or hooks, for example, as a mating piece complementary in shape and function to the at least one recess. The at least one compensating mass may be attached very easily to the rotor, for example by hooking into the said prolongations, and by the alignment of the prolongations in a manner pointing toward the central shaft axis, a self-securing of the at least one compensating mass is achieved by centrifugal forces during movement of the rotor.

It is also conceivable that the at least one recess serves as a passage opening for receiving of a fastening means, which joins the at least one compensating mass to the rotor. Screws or else rivets, for example, are conceivable as fastening means for this purpose.

Due to these types of connection of the at least one compensating mass, a subsequent correction of the shape and/or of the weight is possible very simply, for example by grinding, since the at least one compensating mass can be easily removed and reattached to the rotor for this purpose.

A manifestation is also advantageous in which it may be provided that the first rotor and/or the eccentric cam and/or the at least one compensating mass are made in one piece.

The existence of a one-piece composite of rotor and/or eccentric cam and/or of the at least one compensating mass can be created relatively simply by casting or sintering. This may favor the fatigue strength of the pump by the fact that the boundary faces between rotor and/or eccentric cam and/or the at least one compensating mass are at least partly omitted. Furthermore, time-consuming and costly mounting steps, which would be necessary for the arrangement and/or the connection of the said components to the first rotor, are obviated.

According to a further development, it is possible that the eccentric cam and/or the at least one compensating mass is formed from a material that differs from the material of the at least first rotor, especially by a higher or lower density.

For the manufacture of the rotor, primarily diverse steel types, and for this purpose primarily castable or forgeable steel types or else sintered steel types are conceivable as the first material. Preferably metals and their alloys are considered as the second material for the at least one compensating mass. However, the second material may also be a material composite. For this purpose, substance-to-substance-bonded composites formed from two materials, for example by the use of a sintered compensating mass of a first or second material, with subsequent infiltration by a third material having a lower melting point than the first or second material, come into question as the material composite. If the first material of the rotor is sintered steel, for example, the compensating mass may then be manufactured from a first material, e.g. sintered steel, but with defined porosity, wherein the pores are filled by a second material, e.g. copper/alloys. The second material of the compensating mass is therefore formed from a material composite of sintered steel and copper or a copper alloy with a higher density, whereby the compensating mass must have a smaller volume at equal weight in order to guarantee the functionality. This process may be referred to as additive balancing. In certain cases, however, it may be of advantage to form the compensating mass with a lower density, in order to achieve the effect opposite to that described above, which is referred to as subtractive balancing. The great advantage of this procedure is that a purposeful matching between volume and/or geometry in terms of a necessary compensating mass can be undertaken relatively simply.

By analogy with this, compensating masses of nickel-base or cobalt-base alloys or refractory metals such as tungsten, molybdenum and their alloys, for example, are also conceivable in order to find application as the second material.

Furthermore, it may be expedient when at least the first rotor and/or the eccentric cam and/or the at least one compensating mass are formed as sintered or cast structural parts.

By the primary forming of the at least first rotor and/or of the eccentric cam and/or of the at least one compensating mass as a sintered or cast structural part, a geometry can be established that already corresponds to or at least very closely approaches the final geometry. Thereby possible material-cutting fabrication steps, for example, may be omitted even for complicated geometries. This permits a particularly cost-efficient configuration and manufacture of structural parts of a rotor and/or eccentric cam and/or compensating-mass composite.

Beyond this, it may be provided that each tooth core has a core cross-sectional area and the first end portion, turned toward the first rotor, of each stator tooth is formed as the tooth tip, the tip cross-sectional area of which is larger than the core cross-sectional area.

Due to the formation of a tooth tip projecting beyond the tooth core in radial and/or circumferential direction, a magnetic flux guidance within the stator arrangement is favored, since the tooth tip acts as a flux collector. Higher torque and power densities are made possible in this way. Furthermore, the necessary size of the stator arrangement or respectively of the pump arrangement relative to stator teeth without tooth tip having increased tip cross-sectional area can be reduced in this way. The tooth root of the stator tooth may be received at least partly by the back plate, whereby a shift in radial and/or circumferential direction is avoided. A fastening of the stator teeth on the back plate by means of an adhesive joint and/or by way of a fastening means is advantageous.

Furthermore, it may be provided that the stator teeth and/or the back plate are manufactured from a soft-magnetic composite material.

Soft magnetic composite materials, also known as SMC (soft magnetic composites) have the property that they are magnetically isotropic. Thus stator teeth, and therefore tooth tip, tooth core and tooth root, and/or the back plate may be manufactured from the same SMC, whereby a reduction of the eddy-current losses can be achieved. The back plate may therefore be used as a reflux plate for formation of a magnetic short circuit. In particular, the formation of the stator teeth and/or of the back plate or reflux plate from SMC in the form of a powder-composite material favors the fabrication of complex geometries by sintering processes, for example, whereby the configuration freedom increases and the overall size of the pump arrangement can be reduced.

According to a particular manifestation, it is possible that the stator teeth and the back plate are formed in one piece.

In all mentioned embodiments of this invention, the back plate performs the function of a magnetic yoke. Due to the one-piece construction, boundary-face effects between tooth root and the reflux plate can be decreased, whereby the power density of the stator arrangement can be increased.

According to an advantageous further development, it may be provided that the drive means comprises a flat piston.

For the conveyance or compression of a fluid, it is possible to use above-mentioned drive means, such as for construction of displacement pumps, for example, such as piston-pump and gear-pump arrangements, for example, or else flow pumps, such as impeller arrangements, for example, or else radial or centrifugal pumps. The construction of the piston of the drive means as a flat piston may reduce the overall height of the pump arrangement even further. Advantageously, the flat side of the flat piston is guided substantially parallel to the first rotor.

In particular, it may be advantageous when a second rotor is connected via the shaft to the first rotor provided with the eccentric cam and the stator arrangement is disposed between first and second rotor, and when additional stator teeth distributed concentrically around the shaft axis in circumferential direction, turned toward the second rotor in axial direction and disposed separated from the second rotor by an air gap, are joined at their tooth root to the back plate.

This embodiment according to the invention may therefore be understood in simplified manner as a stator arrangement with stator teeth protruding in double-sided manner from the back plate, wherein a first and second rotor separated on both sides from the stator arrangement by an air gap are disposed on the common shaft. Due to the formation of a second rotor, which just as the first rotor has a multiplicity of permanent magnets, a substantially contactless mounting of the rotors relative to the stator arrangement can be achieved. Furthermore, an increase of the power and/or torque density may be achieved by the use of a second rotor with corresponding stator teeth on the back plate. Hereby the necessary diameter of the axial-flow machine can be reduced, which may contribute to a compacting of the design of the pump arrangement.

The invention further comprises an axial-flow machine for a pump comprising a housing, in which at least one first rotor, a shaft connected at least to the first rotor, a drive means designed for conveyance of a fluid as well as a stator arrangement are mounted, which are formed as a pump arrangement according to the invention.

For this purpose, the axial-flow machine for a pump or compressor is provided in particular with at least one first rotor having permanent magnets, a shaft connected to the first rotor and a stator arrangement, wherein the shaft has a shaft axis and wherein the stator arrangement has a multiplicity of stator teeth distributed concentrically around the shaft axis in circumferential direction and disposed separated from the first rotor in axial direction by an air gap, which stator teeth have two end portions situated oppositely in axial direction and a tooth core between the end portions, and each tooth core is wound with at least one coil winding, and wherein the second end portion, turned away from the first rotor, of each stator tooth is designed as a tooth root, which is joined to a back plate, wherein the first rotor is designed as an eccentric disk and on the side of the first rotor turned away from the stator arrangement has, spaced apart from the shaft axis in radial direction, an eccentric cam, which is connected to the drive means in torque-transmitting and rotatable manner.

BRIEF DESCRIPTION OF THE DRAWINGS

For better understanding of the invention, it will be explained in more detail on the basis of the following figures.

Therein, respectively in greatly simplified schematic diagrams:

FIGS. 2a-2c show oblique views of exemplary embodiments of a rotor with eccentric cam disposed thereon, FIG. 2a showing a one-piece compensating mass, FIG. 2b being a sectional diagram with several detachably attached compensating-mass portions, and FIG. 2c showing several compensating mass portions;

FIGS. 3a-3b show a sectional diagram through exemplary embodiments of stator arrangements, the stator arrangement in FIG. 3a having stator teeth fixed by a fastening means to the back plate, and the stator arrangement in FIG. 3b having stator teeth and back plate formed in one piece;

FIG. 5 shows a sectional diagram of an exemplary embodiment of a pump arrangement or axial-flow machine with stator teeth disposed on both sides on the back plate and respectively oppositely situated first or second rotor.

DETAILED DESCRIPTION OF PREFERRED EMBODIMENTS

By way of introduction, it is pointed out that like parts in the differently described embodiments are denoted with like reference symbols or like structural part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

Figure 1:
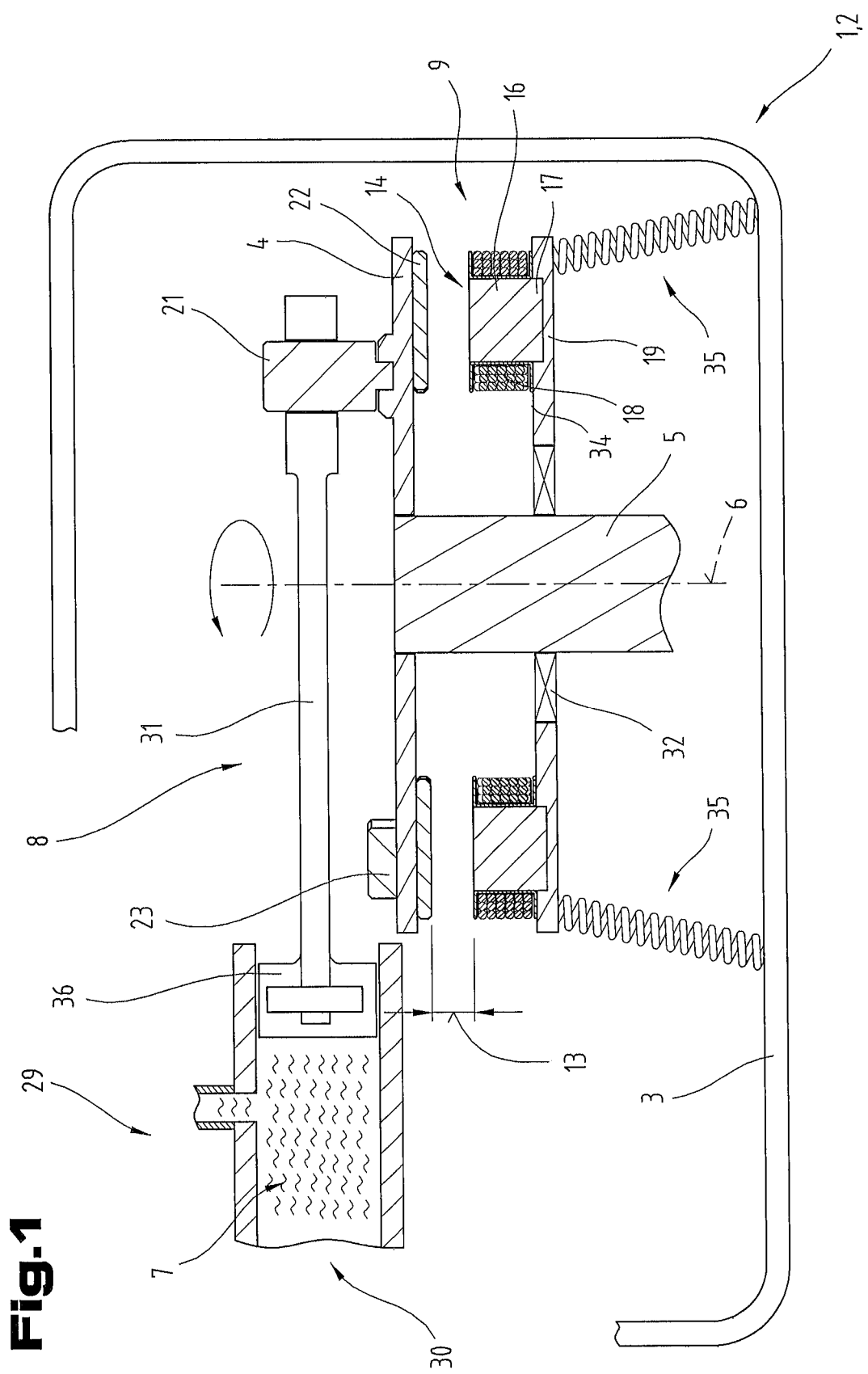
FIG. 1 shows a section through an exemplary embodiment of a pump arrangement or axial-flow machine.

FIG. 1 illustrates an exemplary embodiment of a pump arrangement 1 according to the invention having axial-flow machine 2. The schematically illustrated pump arrangement 1 comprises a housing 3, which is formed as a closed vessel and is perforated only by possible terminal or outlet openings for a fluid 7, electrical contacts, etc. The pump arrangement includes a drive means 8, which for simplicity is illustrated as a piston pump in the exemplary embodiment. The piston 36, which in the diagram is a round piston, is then operatively connected by the movement of the eccentric cam 21 via a connecting rod 31 and conveys or compresses the fluid 7 to be conveyed in a cylinder. The functional principle of a pump or compressor as well as its structural requirements is sufficiently known to the person skilled in the art, and so a detailed description in this regard will not be further provided.

Furthermore, at least one stator arrangement 9, comprising a multiplicity of stator teeth 14 distributed concentrically around the shaft axis 6 of the shaft 5 in circumferential direction 10 and disposed separated from a first rotor 4 by an air gap 13 in axial direction 12 is disposed in this housing 3. The stator teeth 14 have two end portions situated oppositely in axial direction 12 and one tooth core 16 between the end portions, wherein each tooth core 16 is wound with at least one coil winding 18. The second end portion, turned away from the first rotor 4, of each stator tooth 14 is formed as a tooth root 17 and joined to a back plate 19. In this arrangement, the back plate 19 serves as a magnet yoke and favors the development of a magnetic field upon passage of current through the coil winding 18.

Furthermore, it is clearly visible in FIG. 1 that the first rotor 4 is equipped on its side turned toward the stator arrangement 9 with permanent magnets 22, which lead to a rotation of the first rotor 4 upon generation of a magnetic field by passage of current through the coil windings 18. An eccentric cam 21 is disposed on the side of the first rotor 4 that is turned away from the stator arrangement 9, whereby the first rotor 4 is formed as an eccentric disk 20. The drive means 8 is connected in torque-transmitting and rotatable manner to the eccentric cam 21.

Furthermore, it may be inferred from FIG. 1 that possibly bearings 32 illustrated by way of example, may be disposed for absorption of radial and/or axial forces on the shaft 5 or on the housing 3. Likewise, bracing means 35 are schematically indicated, which, as spring elements, for example, favor a vibration damping of the axial-flow machine 2.

FIGS. 2a to 2c illustrate some possible exemplary embodiments of a design according to the invention of the first rotor 4 with eccentric cams 21 as well as compensating mass 23 or compensating-mass portions 24 disposed thereon. This compensating mass 23 or these compensating-mass portions 24 may be rigidly joined to the first rotor 4. Such a fixed joint may be made as an adhesive, soldered or welded joint.

Within the scope of the invention, the at least one compensating mass 23 or the compensating-mass portions 24 of FIGS. 2a to 2c may also take place detachably and interlockingly, e.g. via an at least temporary fixation by way of a fastening means 26 or a hook-type connection. The fastening means 26 may be formed analogously to the fastening, illustrated in FIG. 3a, of the stator teeth 14 on the back plate 19, and will be described further at a later place. The detachable connection of the at least one compensating mass 23 or of the compensating-mass portions 24 permits corrective machining of the individual compensating masses 23 or of the compensating-mass portions 24 for minimization of the imbalance at the eccentric disk 20 or of the first rotor 4.

FIG. 2a illustrates an example of a rotor 4 according to the invention with compensating mass 23 disposed substantially opposite eccentric cam 21 in radial direction 11. The form of the compensating mass 23 illustrated in FIG. 2a is substantially kidney-shaped, in order to fit the radius of the first rotor 4 as well as possible. But rectangular, circular or elliptical shapes for the at least one compensating mass 23 or compensating-mass portions 24 are just as conceivable and adoptable for the embodiments illustrated in FIGS. 2b and 2c.

A further option for fastening of the compensating mass 23 or of the individual compensating-mass portions 24 is indicated schematically in FIG. 2b. In this case, the at least one compensating mass 23 or the compensating-mass portions 24 has or have at least one recess 25, which in the illustrated arrangement extends continuously through the compensating-mass portions 24 in axial direction 12. The first rotor 4 has prolongations 27, formed as hooks or tabs, which are complementary to the recesses 25 in shape and function. The at least one compensating mass 23 or the compensating-mass portions 24 may be fastened thereon by hooking and may form a detachable and interlocking connection to the first rotor 4.

FIG. 2c illustrates an example of a rotor 4 according to the invention with compensating-mass portions 24 disposed substantially opposite the eccentric cam 21 in radial direction 11. These are disposed separated from one another in circumferential direction 10 and in radial direction 11 are spaced apart at substantially the same distance from the shaft axis 6. The above-mentioned connection variants, even though not illustrated, may be adopted logically for this embodiment.

FIGS. 3a and 3b show sectional diagrams through exemplary embodiments of stator arrangements 9, such as may be formed preferably in the pump arrangement according to the invention. The stator teeth 14 comprise at least one first end portion, which is formed as a tooth tip 15, with a tip cross-sectional area that extends normal to the axial direction 12. Furthermore, the stator teeth 14 respectively comprise a tooth core 16, which extends between the first end portion and the second end portion, formed by a tooth root 17. This tooth core 16 has a tooth cross-sectional area that extends normal to the axial direction 12 and is smaller than the tip cross-sectional area.

Stator teeth 14, which are joined via the tooth root 17 to the back plate 19, are schematically illustrated in FIG. 3a. As is evident in the sectional diagram, the stator tooth 14 is segmented into the tooth tip 15 and a one-piece tooth core 16 with a tooth root 17. The stator tooth 14 has a fastening means receptacle 37, which extends continuously at least through the stator tooth 14 in axial direction 12 and is suitable for receiving of a fastening means 26. The fastening means 26 may be a rivet, a screw or the like. The fastening means 26 joins the stator tooth 14 to the back plate 19, which serves as an abutment. Analogously to this joint form, the at least one compensating mass 23 or compensating-mass portions 24 may be fastened on the first rotor 4 via their possible recesses 25 by way of a fastening means 26.

Furthermore, FIGS. 3a and 3b illustrate that the tooth core 16 is wound by a coil winding 18 and that an electrical insulation 34 is disposed at least in between as well as between tooth tip 15 and the coil winding 18.

By way of example, FIG. 3b illustrates an embodiment in which the joint between stator teeth 14 and the back plate 19 is omitted, since they are formed in one piece. A separate illustration of stator teeth 14 that are formed in one piece and are present joined to the back plate 19 is not provided here. The person skilled in the art will be able to imagine possible further intermediate embodiments from the overview comprising FIG. 1, FIGS. 3a and 3b as well as FIG. 4 and FIG. 5.

Figure 4:
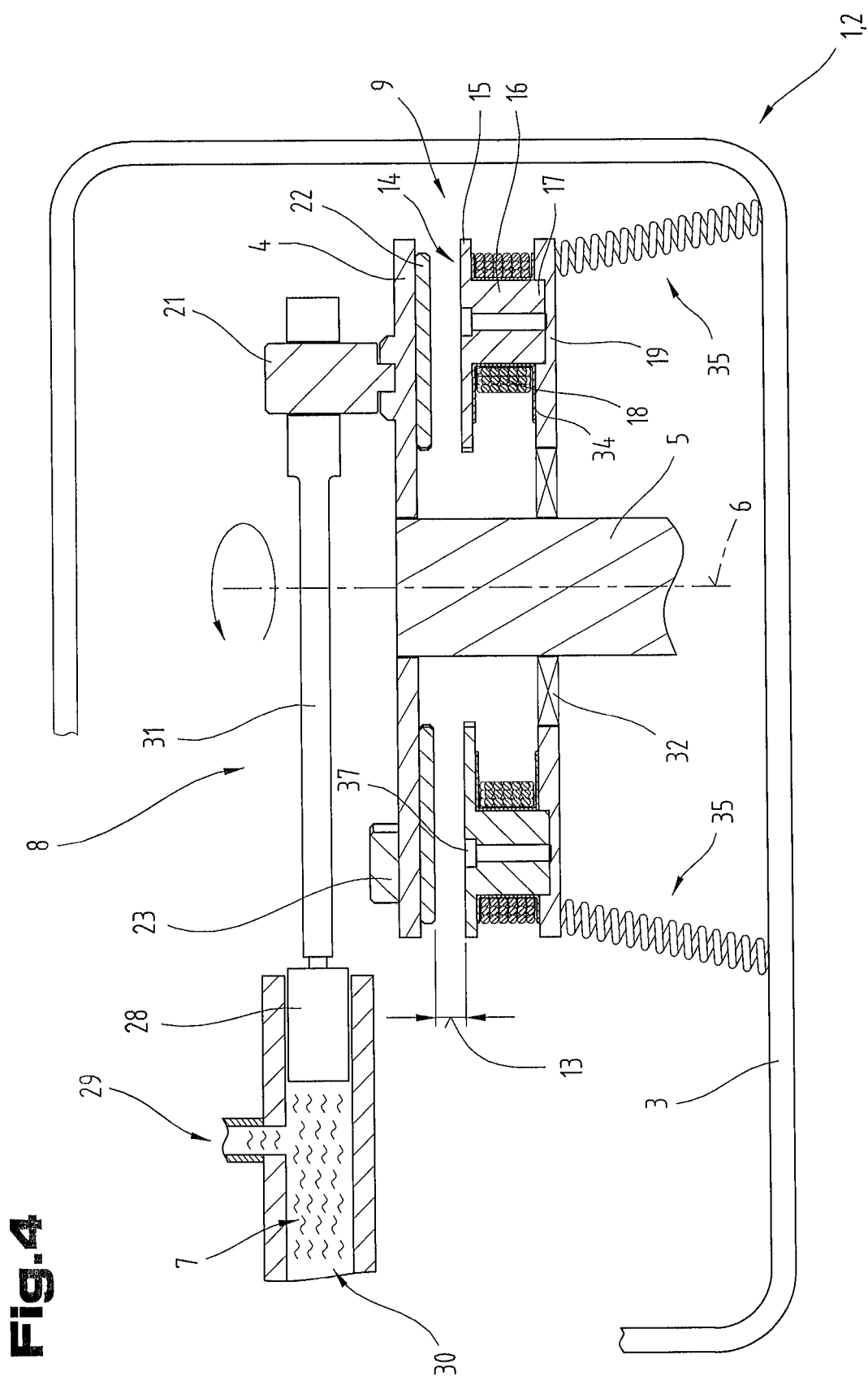
FIG. 4 shows a section through an exemplary embodiment of a pump arrangement or axial-flow machine having stator teeth with tooth tip.

Furthermore, the stator teeth 14 and/or the back plate 19 illustrated in FIG. 1 as well as FIG. 3 to FIG. 5 may be manufactured from a soft-magnetic composite material or else SMC.

A further embodiment, which if necessary is independent in itself, of the pump arrangement 1 or of the axial-flow machine 2 according to the invention, is shown in FIG. 4, wherein once again like reference symbols or structural-part designations are used, as in the foregoing FIG. 1 to FIG. 3. To avoid unnecessary repetitions, the detailed description in the foregoing figures is invoked or reference is made thereto. For this purpose, the drive means 8 depicted in FIG. 4 comprises a flat piston 28, which is guided in a cylinder of the pump or of the compressor. Furthermore, it can be seen from FIG. 4 that the stator arrangement 9 may be provided with the stator teeth 14, having a tooth tip 15 projecting beyond the tooth core 16, mentioned above and illustrated by way of example in FIGS. 3a and 3b. In the illustration in FIG. 4, these stator teeth 14 are formed in one piece, for example, and are received by the back plate 19 at least partly at the tooth root 17. The stator teeth 14 are fixed on the back plate 19 by way of an additional fastening means 26. What is not illustrated, but when considered along with this embodiment, is a one-piece construction of the stator teeth 14 and of the back plate that may have advantages with respect to magnetic-flux guidance and power density. The further illustrated features are to be regarded as analogous to FIG. 1, and so a repetition at this place is avoided.

FIG. 5 represents an exemplary embodiment of a pump arrangement 1 according to the invention, in which a second rotor 33 is formed in addition to the first rotor 4. The second rotor 33 is connected via the shaft 5 to the first rotor 4. The first rotor 4 may be formed according to the foregoing embodiments. In the chosen sectional diagram, a compensating mass 23, which is disposed opposite the eccentric cam 21, is shown by way of example on the first rotor 4. The first rotor 4 and second rotor 33 are respectively separated by an air gap 13 from the stator teeth 14 respectively disposed oppositely in axial direction 12. The permanent magnets 22 disposed on the first rotor 4 and second rotor 33 are aligned parallel to the tooth tips 15.

As can be seen very well in FIG. 5, the stator teeth 14 may be formed on the back plate 19 in a manner pointing in axial direction 12 toward the first rotor 4 or pointing toward the second rotor 33. Especially in this pump arrangement 1 with two rotors 4, 33, it is not necessary for the back plate 19 to be magnetic, whereas this is of advantage in the foregoing exemplary embodiments. Upon passage of current through the coil windings 18, the two rotors 4, 33 are set in motion. The drive means 8 of the pump arrangement 1 connected via the first rotor 4 formed as an eccentric disk 20 permits the conveyance or compression of a fluid 7.

In this connection, the stator teeth 14 of the stator arrangement 9 are received in the manner described above at least partly by the back plate 19 and are fastened by means of an adhesive joint. As explained in the foregoing for FIG. 2 to FIG. 4, additional fastening means 26 may be used for improvement of the fixation of the stator teeth 14. Thus only the fastening-means receptacles 37 are illustrated in FIG. 5. A detailed description will not be repeated here. The further embodiments, not illustrated, of stator teeth 14, which are formed in one piece and which extend on both sides in axial direction 12, starting from the back plate 19 and pointing toward the first rotor 4 or pointing toward the second rotor 33, are mentioned at this place as a further conceivable variant.

In FIG. 5, a bearing 32 is indicated merely schematically as a radial bearing for shaft 5. Suitable bearings for absorption of radial and/or axial forces are known to the person skilled in the art. All above-mentioned exemplary embodiments may therefore have at least one radial and/or axial bearing, but here these are not subject matter of the invention and therefore will not be further discussed.

The pump arrangements depicted in FIG. 1 to FIG. 5 may also be used for compressors of a cooling system in mobile and/or stationary refrigerators. Such a compression cooling system according to the invention is not illustrated, but it usually comprises a condenser, a throttle unit (e.g. capillary tube) and an evaporator, as well as a compression or compressor unit, which is designed according to one of the foregoing examples.

The exemplary embodiments show possible embodiment variants, wherein it must be noted at this place that the invention is not restricted to the specially illustrated embodiment variants of the same, but instead diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

Although only a few embodiments of the present invention have been shown and described, it is to be understood that many changes and modifications may be made thereunto without departing from the spirit and scope of the invention.

LIST OF REFERENCE SYMBOLS

1 Pump arrangement
2 Axial-flow machine
3 Housing
4 First rotor
5 Shaft
6 Shaft axis
7 Fluid
8 Drive means
9 Stator arrangement
10 Circumferential direction
11 Radial direction
12 Axial direction
13 Air gap
14 Stator tooth/teeth
15 Tooth tip
16 Tooth core
17 Tooth root
18 Coil winding
19 Back plate
20 Eccentric disk
21 Eccentric cam
22 Permanent magnet
23 Compensating mass
24 Compensating-mass portion
25 Recess
26 Fastening means
27 Prolongation
28 Flat piston
29 Inlet
30 Outlet
31 Connecting rod
32 Bearing
33 Second rotor
34 Insulation
35 Bracing means
36 Piston
37 Fastening-means receptacle

What is claimed is:

1. A pump arrangement, at least comprising
a housing;
an axial-flow machine mounted in the housing; and
a drive mounted in the housing and designed for conveyance of a fluid;
wherein the axial-flow machine at least is formed by at least one first rotor having permanent magnets, a shaft connected to the first rotor and a stator arrangement;
wherein the shaft has a shaft axis;
wherein the stator arrangement has a multiplicity of stator teeth separated from each other and distributed concentrically around the shaft axis in a circumferential direction and disposed separated from the first rotor in an axial direction by an air gap;
wherein the stator teeth have first and second end portions situated oppositely in the axial direction and a tooth core between the end portions, and each tooth core is wound with at least one coil winding;
wherein the second end portion, turned away from the first rotor, of each stator tooth is designed as a tooth root, which is joined to a back plate;
wherein the first rotor is designed as an eccentric disk and on the side of the first rotor turned away from the stator arrangement has an eccentric cam, disposed spaced apart from the shaft axis in a radial direction, which is connected to the drive in torque-transmitting and rotatable manner;
wherein each tooth core has a tooth core cross-sectional area and the first end portion, turned toward the first rotor, of each stator tooth is formed as a tooth tip, the tooth tip having a tooth tip cross-sectional area which is larger than the tooth core cross-sectional area;
wherein the tooth tip has a substantially rectangular-shaped cross section;
wherein only the tooth core and not the tooth tip is wound with the at least one coil winding;
wherein the stator tooth is segmented into the tooth tip and the tooth core, the tooth core being formed in one piece with the tooth root; and
wherein the tooth tip is manufactured from a soft-magnetic composite material.

2. The pump arrangement according to claim 1, wherein at least the first rotor has at least one compensating mass, which is formed on the side turned away from the stator arrangement and is spaced apart from the shaft axis in the radial direction, and is disposed substantially opposite the eccentric cam in the radial direction.

3. The pump arrangement according to claim 2, wherein the at least one compensating mass is formed from several compensating-mass portions, which are disposed separated from one another in the circumferential direction and/or the radial direction.

4. The pump arrangement according to claim 2, wherein the at least one compensating mass has at least one recess, which is suitable for receiving of at least one prolongation of the first rotor and/or of at least one fastener, and is designed to be interlockingly connectable to the first rotor on its side turned away from the stator arrangement.

5. The pump arrangement according to claim 2, wherein the first rotor and/or the eccentric cam and/or the at least one compensating mass are made in one piece.

6. The pump arrangement according to claim 2, wherein the eccentric cam and/or the at least one compensating mass is formed from a material that differs from the material of the at least first rotor.

7. The pump arrangement according to claim 2, wherein at least the first rotor and/or the eccentric cam and/or the at least one compensating mass are made as a sintered or cast structural part.

8. The pump arrangement according to claim 1, wherein the back plate is manufactured from a soft-magnetic composite material.

9. The pump arrangement according to claim 1, wherein the stator teeth and the back plate are formed in one piece.

10. The pump arrangement according to claim 1, wherein the drive comprises a flat piston.

11. The pump arrangement according to claim 1,
wherein a second rotor is connected via the shaft to the first rotor provided with the eccentric cam;
wherein the stator arrangement is disposed between the first rotor and the second rotor; and
wherein additional stator teeth distributed concentrically around the shaft axis in the circumferential direction, turned toward the second rotor in the axial direction and disposed separated from the second rotor by an air gap are joined at their tooth root to the back plate.

12. A cooling system, comprising a compression unit comprising the pump arrangement according to claim 1.

* * * * *